US012559962B2

(12) United States Patent
Ben Dov et al.

(10) Patent No.: US 12,559,962 B2
(45) Date of Patent: Feb. 24, 2026

(54) POOL CLEANING ROBOT BACKWASH SYSTEM AND METHOD

(71) Applicant: Maytronics Ltd., Kibutz Yizrael (IL)

(72) Inventors: Boaz Ben Dov, Ram On (IL); Leo Hershzenhaut, Haifa (IL)

(73) Assignee: Maytronics Ltd., Kibutz Yizrael (IL)

( * ) Notice: Subject to any disclaimer, the term of this patent is extended or adjusted under 35 U.S.C. 154(b) by 661 days.

(21) Appl. No.: 17/811,064

(22) Filed: Jul. 6, 2022

(65) Prior Publication Data

US 2023/0008930 A1 Jan. 12, 2023

Related U.S. Application Data

(60) Provisional application No. 63/203,059, filed on Jul. 6, 2021.

(51) Int. Cl.
E04H 4/16 (2006.01)
B01D 35/02 (2006.01)

(52) U.S. Cl.
CPC ........... E04H 4/1654 (2013.01); B01D 35/02 (2013.01)

(58) Field of Classification Search
CPC ........... B08B 1/30; B08B 1/40; B01D 35/157; B01D 35/1573; B01D 35/02; B01D 29/66; B01D 2201/08; B01D 2201/16; B01D 2201/165; B01D 2201/313; C02F 2103/42; E04H 4/16; E04H 4/1654

USPC ............................ 15/1.7; 210/275, 108, 411
See application file for complete search history.

(56) References Cited

U.S. PATENT DOCUMENTS

| | | | | |
|---|---|---|---|---|
| 2014/0076789 | A1* | 3/2014 | Shlomi-Shlomi | ..... E04H 4/1209 |
| | | | | 901/44 |
| 2018/0229160 | A1* | 8/2018 | Witelson | ................ B01D 29/66 |

FOREIGN PATENT DOCUMENTS

| | | |
|---|---|---|
| EP | 2725169 A2 | 4/2014 |
| EP | 2821564 A2 | 1/2015 |
| EP | 3613925 A | 2/2020 |

* cited by examiner

*Primary Examiner* — Brian D Keller
*Assistant Examiner* — Sidney D Full
(74) *Attorney, Agent, or Firm* — Reches Patents

(57) ABSTRACT

A pool related platform that may include (i) a drive mechanism for moving the pool related platform; (ii) a housing that has a first fluid opening and a second fluid opening; (iii) a filtering unit that comprises a filtering element; (iv) a fluid flow mechanism for inducing a flow of fluid through the filtering unit in a first direction during a filtering process, and for inducing a flow of the fluid through the filtering element at another direction during a backwash process; (v) an entrapment cell; and (vi) a flow control unit that comprises a flow control element and an inlet that is maintained open during the filtering process and the backwash process; wherein the flow control unit is configured to allow debris and fluid from the filtering unit to enter the entrapment cell, and is configured to substantially prevent a flow of fluid and debris from the entrapment cell to the filtering unit.

17 Claims, 5 Drawing Sheets

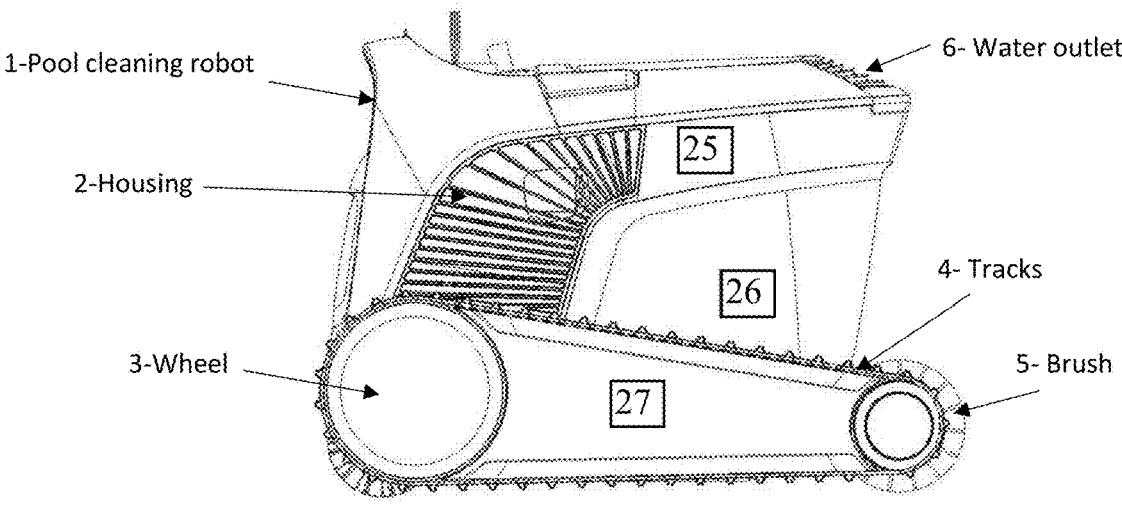

1-Pool cleaning robot

6- Water outlet

2-Housing

4- Tracks

3-Wheel

5- Brush

7- Main filter chamber

6- Water outlet

8- Impeller

9-Pump motor

14- Water flow direction when in reverse, second rotational direction ("backwash" mode).

10 - non-return

11- Water inlet in a first rotational direction.

13- entrapment cell inlet.

12- Entrapment cell for backwashed dirt

FIG. 2

15- Filter assembly 16- filter screen or mesh

18-Bottom main filter cover and entrapment cell release latch.

17-Entrapment cell assembly

19-Entrapment cell opening latch.

FIG. 3

WIDTH

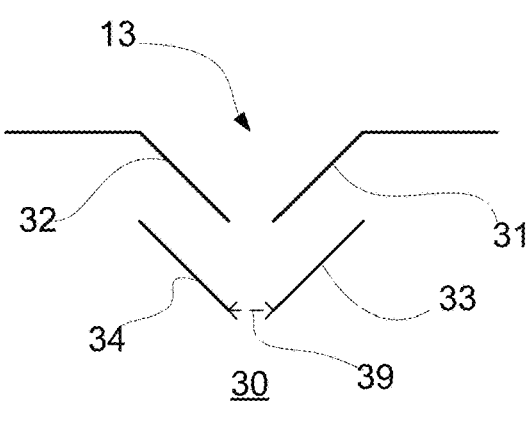
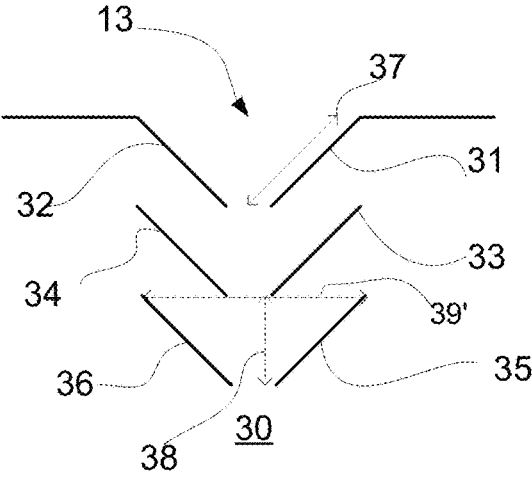
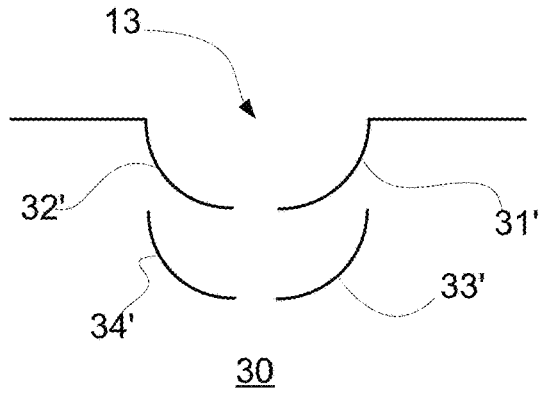
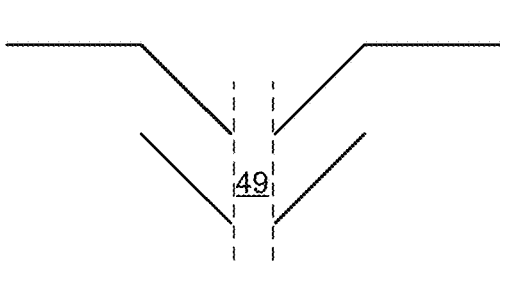
FIG. 13

Figure 14:
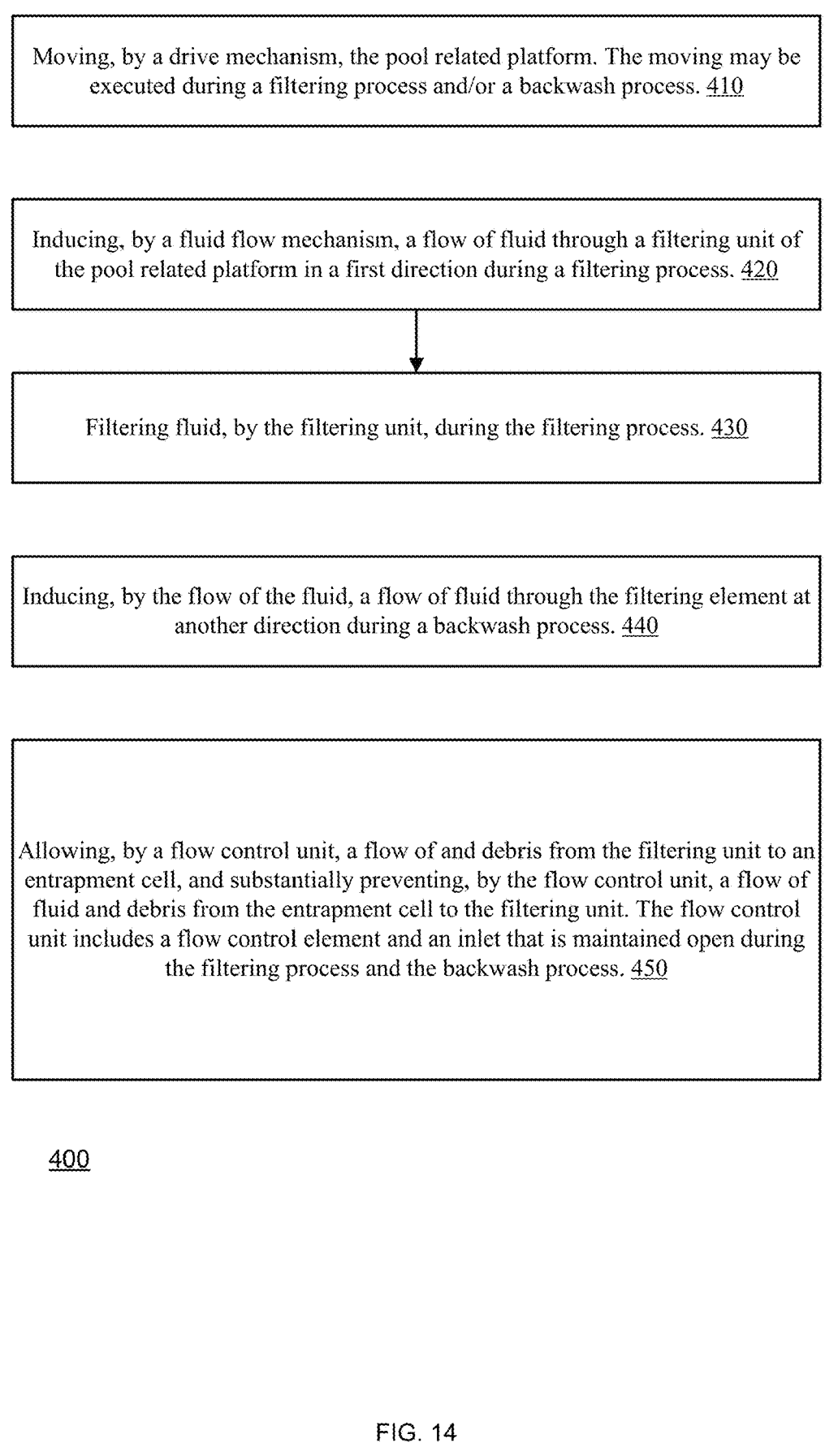

Moving, by a drive mechanism, the pool related platform. The moving may be executed during a filtering process and/or a backwash process. 410

Inducing, by a fluid flow mechanism, a flow of fluid through a filtering unit of the pool related platform in a first direction during a filtering process. 420

Filtering fluid, by the filtering unit, during the filtering process. 430

Inducing, by the flow of the fluid, a flow of fluid through the filtering element at another direction during a backwash process. 440

Allowing, by a flow control unit, a flow of and debris from the filtering unit to an entrapment cell, and substantially preventing, by the flow control unit, a flow of fluid and debris from the entrapment cell to the filtering unit. The flow control unit includes a flow control element and an inlet that is maintained open during the filtering process and the backwash process. 450

POOL CLEANING ROBOT BACKWASH SYSTEM AND METHOD

BACKGROUND

Pool cleaning robots are known in the art and are expected to clean swimming pools by filtering the fluid of the pool and removing foreign particles from that fluid by separation. Such foreign particles tend to aggregate within the pool cleaning robot at least one main filtering unit and may eventually substantially reduce the filtering capabilities of the pool cleaning robot.

There is a growing need to provide an efficient pool cleaning robot that can maintain a reasonable filtering capability during long periods of time.

SUMMARY

According to an embodiment of the invention there is provided a pool related platform and a method.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates an example of an example of a pool cleaning robot;

FIG. 2 illustrates an example of an example of a cross sectional side view of a pool cleaning robot;

FIG. 3 illustrates an example of an example of a filter assembly of the pool cleaning robot;

FIGS. 12 and 13 illustrate an example of a removeable entrapment cell base of the pool cleaning robot; and FIG. 14 illustrates an example of a method.

DETAILED DESCRIPTION OF THE DRAWINGS

Figure 4:
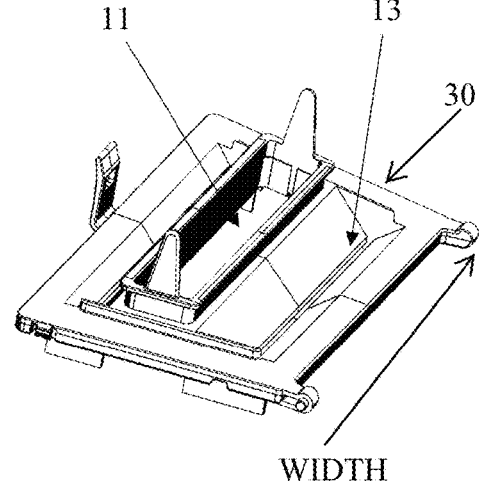
FIG. 4 illustrates an example of an entrapment cell assembly cover of the pool cleaning robot.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a pool related platform (PRP) that includes a filtering unit, a entrapment cell and a flow control unit that may act as virtually a uni-directional value—while keeping an inlet of the flow control unit open. The flow control unit may be without movable elements—which increases the durability and reliability of the flow control unit.

The PRP may be any platform that may perform an operation related to a fluid of a pool—cleaning, changing chemical composition, monitoring, and the like. Examples of a PRP include a pool robot that differs from a pool cleaning robot (PCR), a PCR, a floating unit, a skimmer, and the like. Any example related a PCR may be applied mutatis mutandis, to any other PRP.

For simplicity of explanation the following examples will refer to a PCR.

FIG. 1 depicts pool related platform such as PCR 1, that includes a housing 2 (or a hollow body), wheels 3, tracks 4, cleaning brushes 5, a water outlet 6 and the water inlet 11, drive motor 27, controller 25 and sensor 26.

FIG. 2 depicts a hydraulic trajectory of drawn-in or sucked-in water of a swimming pool or tank, by a pool cleaning robot while submerged underwater, from the water inlet 11 all the way to the water outlet 6 by means of an impeller 8 and a pump motor 9, passing by a flexible flap (non-return valve 10) element which is pulled open when the drawing of water is in the first rotational direction. The water is filtered in the filter assembly section of the main filter chamber 7. FIG. 2 further depicts the reverse movement of water when there is provided a second rotational direction of water within the hydraulic path between the outlet 6 and the water inlet 11. In this specification, it is effectively a backwash mode but not in the traditional meaning of an operation of purging through dirt or debris out of the hydraulic system path but rather as a means of self-cleaning of the filter or filters.

The second rotational direction or the said backwash operation may be applied after the pool cleaning robot has finished its cleaning cycle and is in a standstill position. Namely, backwash mode may be initiated after cycle time ended and all engines or motors were shut-off.

The fine dirt particles will therefore be released from the main filter chamber 7 to eventually settle within the entrapment cell 12.

When in second water flow direction, or in the "backwash mode", the water is forced against the external side of the at least one filter screen or mesh 16 thereby impacting the mesh and releasing the dirt attached onto the internal side of the said mesh.

This "backwash mode" process could be intermittent i.e.: in consecutive or intermittent back-forth suction pulses. Namely, the backwash pulses may be executed in both directions within the hydraulic path. The impeller may rotate CW (clockwise) for a few seconds or CCW, backwards or forward for a few seconds to improve dirt release.

Depending on filter cleanliness, the entire process may last a minute or up to 5 minutes. Filter cleanliness is measured using impeller motor RPM and electrical current measurements and/or a separate internal pressure sensor.

All electrical cables, wiring, motors or sensors are regulated by a smart computer PCB located in a sealed compartment, possibly in the vicinity of the pump motor (9) and/or a drive motor (not shown).

The said automatic backwash mode may be overridden by an end user, external to the pool, to remotely initiate by means of a smart wireless or wired device to command a start and/or end of the said backwash initiation process. The end user may be made aware or messaged in mid cleaning cycle of a clogged filter. The ends user will switch-off the pool cleaning robot and press a dedicated backwash button, in an app or RCU, to start the said self-cleaning backwash process.

FIG. 3 depicts a filter assembly 15 that packages all the components of a PCR filtering system. That will include the filter screens or meshes that constitute the filtering media. There could be one layered filter insert or multiple inserts each with different filtering characteristics that may even one onto the other to form a multi layered filter media (not shown).

Depicted is filter screen mesh 16 that may be a rough filter mesh with small filtering pores (filtering fine dirt particles or dust) which is the main concern with filter pores clogging. A second, fine filter mesh (filtering coarse or large debris such as leaves) is not depicted but any backwashed water impacting the outer filter wall will impact one, two or more filter layers to accomplish the self-cleaning effect of this specification.

The said filter assembly 15 includes a main filter chamber removably connected to a dirt entrapment cell 12 that is preferably attached to bottom of the main filter chamber 16.

There is provided a release latch 18 that in a first instance, may cause release and opening of the bottom section (or floor) of the filter assembly section 15. That will effectively also release and open the entrapment cell assembly 17 that will remain attached on a hinge.

Figure 7:
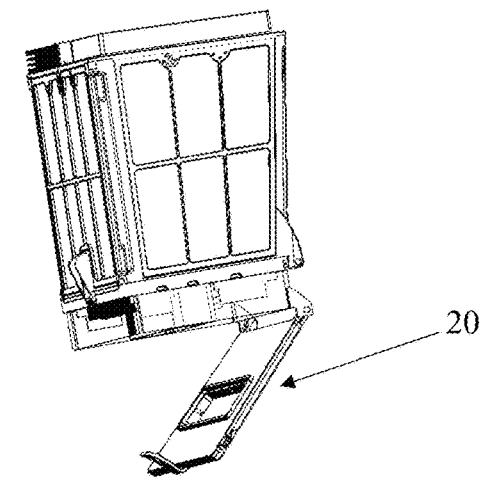
FIG. 7 illustrates an example of an open bottom entrapment cell released cover of the pool cleaning robot.
Figure 8:
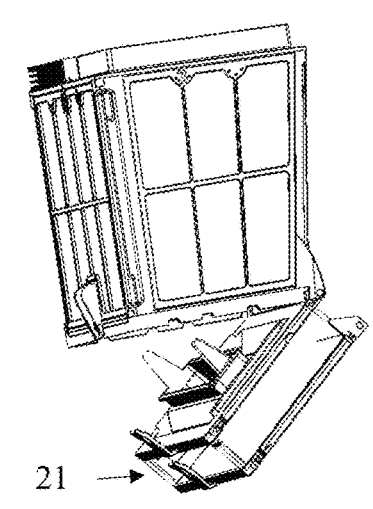
FIG. 8 illustrates an example of an open main filter chamber cover with released entrapment cell of the pool cleaning robot.

FIG. 7 and FIG. 8 both depict the bottom section (or floor) of the filter assembly section 15 being also the top section of the entrapment cell assembly 17

The end user pulling out the filter assembly from the PCR housing has two options. To visually inspect both the volume of dirt in the main filter chamber and in the entrapment cell. The end user my choose to open just the bottom entrapment cell bottom lid for cleaning and washing 20 or to also release and open the main filter chamber to clean the main filter.

FIG. 4 depicts the top lid of the entrapment cell (that is also the bottom floor base of the main filter chamber) that includes an inlet (referred to as an entrapment cell inlet 13. There may be provided multiple such inlets, symmetrically or non-symmetrically aligned. The figure also illustrates the first fluid inlet 11. FIG. 4 also illustrates the width axis—corresponding to a transverse axis of the PCR.

Figure 5:
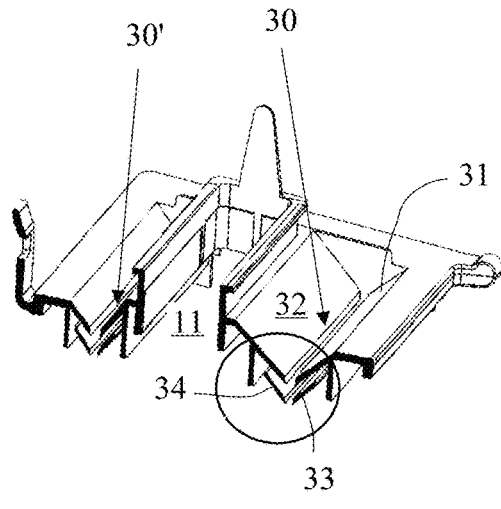
FIG. 5 illustrates an example of an example of a side view of the entrapment cell assembly cover of the pool cleaning robot.

FIG. 5 depicts two flow control units 30' and 31—located at both sides of the first fluid inlet 11. The flow control unit has V-shaped inlet that is defined by the flow control elements. The flow control unit includes two sets of two flow control elements each—denoted 31, 32, 33 and 34.

The inlet allows dirt to get into and through the entrapment inlet but prevents or minimizes any return of dirt from the entrapment cell to the main filter chamber. Double or more such V-shaped elements (flow barriers) may be envisaged. Shapes other than V-shaped elements may be provided—curved, partially curved, and the like.

Figure 6:
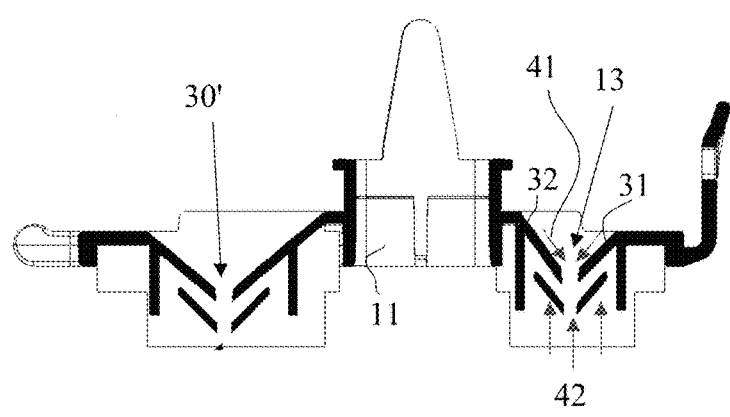
FIG. 6 illustrates an example of an example of a cross sectional side view of the entrapment cell assembly cover of the pool cleaning robot.

FIG. 6 depicts a double inlet opening the principle by which the inlet passage between the main filter chamber and the entrapment chamber may remain open throughout any rotational direction suction mode. The shape and arrangement of the entrapment cell inlet is based on the principle and geometrical arrangement whereby the primary water flow—when in suction mode or in a first rotational direction—when water is drawn from the inlet—has a reduced velocity power because of the countering opposing flow of water. In other words, the countering pressure of the water at the opposing dirt flow direction holds the water and especially dirt (42) from flowing back into main filter chamber.

FIG. 7 illustrates an open bottom 20 of the entrapment cell that is rotatably coupled to the filtering unit or other parts of the entrapment cell. The bottom is at an open position for cleaning dirt from the entrapment cell. FIG. 8 illustrates an entrapment cell 21 that as a whole is rotatably coupled to the filtering unit.

Figure 9:
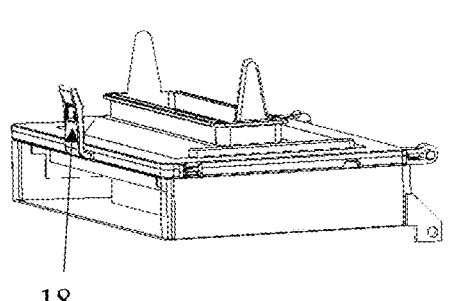
FIG. 9 illustrates an example of an example of a main removable bottom filter cover and entrapment cell of the pool cleaning robot.

FIG. 9 depicts the release latch 18 that can release and open the bottom main filter cover.

Figure 10:
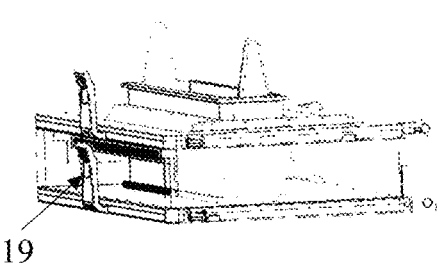
FIG. 10 illustrates main removable bottom filter cover and entrapment cell bottom cover release latches of the pool cleaning robot.

FIG. 10 depicts the second latch that opens the bottom entrapment cell lid 19.

Figure 11:
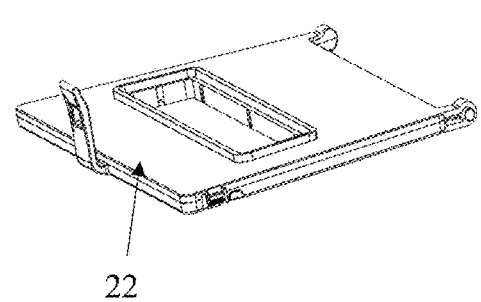
FIG. 11 illustrates an example of an example of a removeable entrapment cell bottom cover of the entrapment cell of the pool cleaning robot.

FIG. 11 depicts a removable entrapment cell bottom cover 22. It includes a bottom entrapment cell lid with hinges and main water inlet passage.

Figure 12:
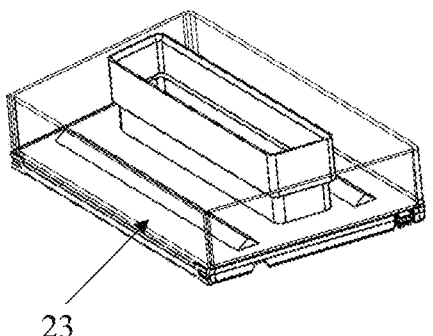

FIG. 12 depicts the entrapment base cell 23 that may be constructed of opaque material or a transparent polymer allowing to view the dirt quantity inside the said cell.

FIG. 13 illustrates example of flow control unit 30 or 30'.

The first example illustrates two pairs of positively sloped flow control elements and negatively sloped flow control elements—such as 31, 32, 33 and 34.

The second example illustrates three pairs of positively sloped flow control elements and negatively sloped flow control elements—such as 31, 32, 33, 34, 35 and 36.

The third example illustrates two pairs of curved elements—such as 31', 32', 33' and 34'.

The fourth example illustrates that the flow control unit defines a fluid path 49 between the flow control elements and through the inlet.

Examples to the distances between sloped elements (width of the fluid path) may be one till ten millimetres, below one millimetre, between 10 and 30 millimetres, and above. The width may be determined based on the sizes of the filtering unit, the water velocity during backwash, the pumping power during backwash, and the like.

FIG. 13 also illustrates the distance 39 between bottom ends of sloped flow control elements of a pair of elements, a distance 38 between consecutive pairs, and a length 37 of sloped flow control elements.

There is provided pool related platform that may include a drive mechanism for moving the pool cleaner (for example wheels 3, tracks 4, drive motor (not shown)), a housing (2) that has a first fluid opening (for example water inlet 11 when filtering), a second fluid opening (for example water outlet 6 in filtering), a filtering unit that comprises a filtering element (for example filter assembly 15 including filter screen or mesh 16 and located in main filter chamber 7), a fluid flow mechanism (for example impeller 8, pump motor 9) for inducing a flow of fluid through the filtering unit in a first direction during a filtering process, and for inducing a flow of the fluid through the filtering element at another direction during a backwash process, an entrapment cell (12) and a flow control unit (30, 30') that include a flow control element (for example 31, 32, 33, 34, 35, 36, 31', 32', 33', and 34') and an inlet (13) that is maintained open during the filtering process and the backwash process. The flow control unit is configured to allow debris and fluid from the filtering unit to enter the entrapment cell, and is configured to substantially prevent a flow of fluid and debris from the entrapment cell to the filtering unit. Substantially prevent—may include preventing by at least 70, 75, 80, 85, 90, 95, 99 percent).

The entrapment cell may be located below the filtering unit.

The flow control unit may include a plurality of flow control elements.

The at least one portion of at least one of the flow control elements may not be parallel to the inlet. In FIGS. 4-6 the flow control elements are sloped.

At least one portion of at least one of the flow control elements may be curved.

The flow control unit may include two or more sets of sloped flow control elements. For example two sets—the first set includes flow control elements 31 and 32, and the second set includes flow control elements 33 and 34.

Different flow control elements may be of the same shape and size—or may differ from each other by shape and/or size.

The flow control unit may include one or more inlets and two or more sets of sloped flow control elements per each inlet of the one or more inlets.

The PRP may include an additional flow control unit (30'). The first fluid opening 11 may be located between the flow control unit and the additional flow control unit.

A set of sloped flow control elements may include comprises a positively sloped flow control element (for example 31, 33) and a negatively sloped flow control element (for example 32, 34).

A distance (denoted 39 in FIG. 13) between bottom ends of the positively sloped flow control element and the negatively sloped flow control element is smaller than a distance (denoted 39') between upper ends of the positively sloped flow control element and the negatively sloped flow control element.

The sloped flow control elements may be plates or may differ from plates—may have an elliptical cross section, a polygon cross section, and the like.

The distance between bottom ends of the positively sloped flow control element and the negatively sloped flow control element may be smaller than (i) a length (denoted 37 in FIG. 13) of the positively sloped flow control element, and (ii) a length of the negatively sloped flow control element.

The length of each one of the positively sloped flow control element and the negatively sloped flow control element is smaller than a width (see FIG. 4) of each one of the positively sloped flow control element and the negatively sloped flow control element.

The width of each one of the positively sloped flow control element and the negatively sloped flow control element may exceed half of a width of the housing.

The positively sloped flow control element and the negatively sloped flow control element are symmetrical about a symmetry axis.

Each set of sloped flow control elements may include a positively sloped flow control element and a negatively sloped flow control element.

The sets may be parallel to each other. One or more sets may not be parallel to each other.

Two or more sets of sloped flow control elements may consist of two sloped flow control elements.

The sloped flow control elements of the two or more sets of sloped flow control elements may be static.

The entrapment cell may be positioned between the filtering unit and a bottom of the housing.

The PCP may include a sensor (denoted 26 in FIG. 1) for sensing when the filtering element is clogged to a predefined level.

The PCP may include a controller (denoted 25 in FIG. 1) that is configured to trigger the backwash process when the sensor senses that the filtering element is clogged to the predefined level.

The sensor may be configured to sense a pressure within the pool cleaner.

As stated, the said sensor configured to sense an adverse low pressure (vacuum) or a high pressure within the pool cleaner may initiate a backwash process or notify the ends user to such effect.

The sensor may be configured to monitor at least one of a pump motor and an impeller of the fluid flow mechanism.

FIG. 14 illustrates method 400.

Method 400 may be executed by any of the PCP illustrated above.

Method 400 may include step 410 of moving, by a drive mechanism, the pool related platform. The moving may be executed during a filtering process and/or a backwash process. The PCP may maintain still during the backwash process.

Method 400 may also include step 420 of inducing, by a fluid flow mechanism, a flow of fluid through a filtering unit of the pool related platform in a first direction during a filtering process.

Step 420 may be followed by step 430 of filtering fluid, by the filtering unit, during the filtering process.

Method 400 may also include step 440 of inducing, by the flow of the fluid, a flow of fluid through the filtering element at another direction during a backwash process.

Method 400 may also include step 450 of allowing, by a flow control unit, a flow of and debris from the filtering unit to an entrapment cell, and substantially preventing, by the flow control unit, a flow of fluid and debris from the entrapment cell to the filtering unit. The flow control unit includes a flow control element and an inlet that is maintained open during the filtering process and the backwash process.

The pool cleaning robot may include a filter assembly or a filtering unit; an entrapment cell or entrapment cell; an impeller; a pump motor arranged to rotate the impeller; a driving unit arranged to move the pool cleaning robot; cleaning brushes; wheels and/or tracks; and a housing that may include an internal body space; and at least a first water suction inlet and at least a first water outlet. The impeller may be arranged to rotate along a first rotational direction. The rotation of the first impeller along a first rotational direction causes fluid to be drawn through the inlet and to follow a path within the said housing space during which the fluid is filtered by the filter to provide filtered fluid that exits through the first outlet of the housing;

The first inlet may be proximate to a first movable flap that may be arranged to move between an inlet closing position and a fluid directing position.

The first movable inlet flap when positioned at the inlet closing position may be arranged to prevent particles to exit the pool cleaning robot.

The first movable inlet flap may be arranged to move to an open position by the fluid suction force applied against which is caused by the rotation of the first impeller along the first rotational direction (suction mode).

The drawn-in water and dirt particles mixture are retained on the inside of the screens or meshes of the main filter elements or within the main filter chamber.

The dirt particles remain attached onto the filter screen meshes and the filtered water continues to be drawn to exit through the pores and to continue to flow out through the pool cleaning robot outlet.

The housing may include multiple inlets that are located between the filter assembly and the housing wall; and wherein each inlet may be proximate to a movable flap or non-return valve.

The impeller may be arranged—when rotating along a second rotational direction—that is opposite to the said first rotational direction—to perform a backwash operation.

The initiation of such a backwash comes from a sensor system that includes either an impeller RMP current measurement (low RPM means filter is clogged), or a pressure sensor that senses changes of water pressure levels inside the pool cleaning robot; or, a system of both types sensors where the results are stored in the pool cleaning robot memory.

The second rotational direction or the said backwash operation may be applied after the pool cleaning robot has finished its cleaning cycle and is in a standstill position. Namely, all engines or motors are shut-off.

The backwash system applied in this specification has the water flowing in reverse from the water outlet, through the hydraulic path, towards the external filter screen or screens. The water impacts the filter screens and vibrates them to release trapped dirt and debris on the internal side of the screen (inside of the main filter chamber). The released dirt may settle down gravitationally towards the bottom of the main filter chamber.

A part of the said reversed backwash water may traverse and push against the screen mesh pores to assist with the releasing of trapped dirt particles on the inside mesh surfaces.

Only a small volume of water may traverse the said screens because the reversed hydraulic path has no open outlet on its second end when operating in the second rotational direction. In other words, the hydraulic path is blocked and cannot flow through. This blockage occurs because the at least one, flexible flap (or non-return valve) at the pool cleaning robot inlet, that opens-up only during the first rotational direction—is closed. Secondly, and this will be discussed in greater detail further-on, the fine dirt entrapment cell or entrapment cell is effectively a sealed box, made of solid material that is not arranged to be permeable to allow water to flow through the dirt entrapment cell walls.

The said solid material may be made of transparent polymer to allow an end user to visually inspect if the entrapment cell is full and needs emptying, cleaning or washing.

The filter assembly may be arranged to be constructed of two interconnected functional chambers or spaces.

Namely, the main filter chamber unit, may consist of one or more filter screens or filtering meshes to filter various size debris drawn from the inlet. For example, a large porosity mesh for larger debris, such as leaves, followed by a smaller porosity filter mesh to trap finer dirt such as silt or sand. Any combination of different sized mesh porosities are possible.

For ease of filter service cleaning, attached onto the said main filter chamber may be connected an entrapment cell assembly that is removably attached onto the lower, bottom section of the main filter chamber by means of moveable hinges.

Following a filter assembly removal from the hollow body or housing (for service cleaning) there are provided a few options to the end uses:

A. The entire filter assembly is pulled out and the filter closing lid (may be situated at the bottom) is opened to release the filter chamber bottom lid and the entrapment cell. The filter closing lid and the entrapment cell remain attached and hanging on a movable hinge.

B. The contents of the main filter chamber and the entrapment cell are inspected where the main filter chamber contents may be cleared, cleaned and washed using running water.

C. the attached entrapment cell may be further opened, its contents emptied and washed.

D. the attached entrapment cell may optionally be released and further dismantled from the main filter chamber, opened for thorough cleaning or washing of each part of the entrapments cell.

In order to release the entrapment cell from the main filter chamber, there may be provided a latch that may pulled or pushed to release a clip attaching both parts.

Another latch is provided for the opening of the entrapment cell.

The entrapment cell assembly may further consist of two detachable sub parts: a) an entrapment cell cover and b) an entrapment cell housing.

Both said cover and housing may be disconnected to empty dirt, dust or silt contents and washing of same.

More importantly, when the pool cleaning robot is engaged in drawing water in the second rotational direction while performing the said backwash operation, the flexibility of the entrapment cell arrangement, may allow additional water, albeit a relatively small volume of water, to pass through the filter screen mesh after the initial, vibrating water impacts against the screens.

The impeller is electronically and independently controllable.

The pool cleaning robot may include a filter assembly or a filtering unit; an entrapment cell or entrapment cell; an impeller; a pump motor arranged to rotate the impeller; a driving unit arranged to move the pool cleaning robot; cleaning brushes; wheels and/or tracks; and a housing that may include an internal body space; and at least a first water suction inlet and at least a first water outlet. The impeller may be arranged to rotate along a first rotational direction. The rotation of the first impeller along a first rotational direction causes fluid to be drawn through the inlet and to follow a path within the said housing space during which the fluid is filtered by the filter to provide filtered fluid that exits through the first outlet of the housing;

The first inlet may be proximate to a first movable flap that may be arranged to move between an inlet closing position and a fluid directing position.

The first movable inlet flap when positioned at the inlet closing position may be arranged to prevent particles to exit the pool cleaning robot.

The first movable inlet flap may be arranged to move to an open position by the fluid suction force applied against which is caused by the rotation of the first impeller along the first rotational direction (suction mode).

The drawn-in water and dirt particles mixture are retained on the inside of the screens or meshes of the main filter elements or within the main filter chamber.

The dirt particles remain attached onto the filter screen meshes and the filtered water continues to be drawn to exit through the pores and to continue to flow out through the pool cleaning robot outlet.

The housing may include multiple inlets that are located between the filter assembly and the housing wall; and wherein each inlet may be proximate to a movable flap or non-return valve.

The impeller may be arranged—when rotating along a second rotational direction—that is opposite to the said first rotational direction—to perform a backwash operation.

The initiation of such a backwash comes from a sensor system that includes either an impeller RMP current measurement (low RPM means filter is clogged), or a pressure sensor that senses changes of water pressure levels inside the pool cleaning robot; or, a system of both types sensors where the results are stored in the pool cleaning robot memory.

The second rotational direction or the said backwash operation may be applied after the pool cleaning robot has finished its cleaning cycle and is in a standstill position. Namely, all engines or motors are shut-off.

The backwash system applied in this specification has the water flowing in reverse from the water outlet, through the hydraulic path, towards the external filter screen or screens. The water impacts the filter screens and vibrates them to release trapped dirt and debris on the internal side of the screen (inside of the main filter chamber). The released dirt may settle down gravitationally towards the bottom of the main filter chamber.

A part of the said reversed backwash water may traverse and push against the screen mesh pores to assist with the releasing of trapped dirt particles on the inside mesh surfaces.

Only a small volume of water may traverse the said screens because the reversed hydraulic path has no open outlet on its second end when operating in the second rotational direction. In other words, the hydraulic path is blocked and cannot flow through. This blockage occurs because the at least one, flexible flap (or non-return valve) at the pool cleaning robot inlet, that opens-up only during the first rotational direction—is closed. Secondly, and this will be discussed in greater detail further-on, the fine dirt entrapment cell or entrapment cell is effectively a sealed box, made of solid material that is not arranged to be permeable to allow water to flow through the dirt entrapment cell walls.

The said solid material may be made of transparent polymer to allow an end user to visually inspect if the entrapment cell is full and needs emptying, cleaning or washing.

The filter assembly may be arranged to be constructed of two interconnected functional chambers or spaces.

Namely, the main filter chamber unit, may consist of one or more filter screens or filtering meshes to filter various size debris drawn from the inlet. For example, a large porosity mesh for larger debris, such as leaves, followed by a smaller porosity filter mesh to trap finer dirt such as silt or sand. Any combination of different sized mesh porosities are possible.

For ease of filter service cleaning, attached onto the said main filter chamber may be connected an entrapment cell assembly that is removably attached onto the lower, bottom section of the main filter chamber by means of moveable hinges.

Following a filter assembly removal from the hollow body or housing (for service cleaning) there are provided a few options to the end uses:

A. The entire filter assembly is pulled out and the filter closing lid (may be situated at the bottom) is opened to release the filter chamber bottom lid and the entrapment cell. The filter closing lid and the entrapment cell remain attached and hanging on a movable hinge.

B. The contents of the main filter chamber and the entrapment cell are inspected where the main filter chamber contents may be cleared, cleaned and washed using running water.

C. the attached entrapment cell may be further opened, its contents emptied and washed.

D. the attached entrapment cell may optionally be released and further dismantled from the main filter chamber, opened for thorough cleaning or washing of each part of the entrapments cell.

In order to release the entrapment cell from the main filter chamber, there may be provided a latch that may pulled or pushed to release a clip attaching both parts.

Another latch is provided for the opening of the entrapment cell.

The entrapment cell assembly may further consist of two detachable sub parts: a) an entrapment cell cover and b) an entrapment cell housing.

Both said cover and housing may be disconnected to empty dirt, dust or silt contents and washing of same.

More importantly, when the pool cleaning robot is engaged in drawing water in the second rotational direction while performing the said backwash operation, the flexibility of the entrapment cell arrangement, may allow additional water, albeit a relatively small volume of water, to pass through the filter screen mesh after the initial, vibrating water impacts against the screens.

The impeller is electronically and independently controllable.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A pool related platform, comprising:
   a drive mechanism for moving the pool related platform;
      a housing that has a first fluid opening and a second fluid opening;
   a filtering unit that comprises a filtering element;
      a fluid flow mechanism for inducing a flow of fluid through the filtering unit in a first direction during a filtering process, and for inducing a flow of the fluid through the filtering element at another direction during a backwash process;
   an entrapment cell; and
      a flow control unit that comprises (a) one or more inlets that are maintained open during the filtering process and the backwash process, and (b) two or more sets of sloped flow control elements per each inlet of the one or more inlets; wherein the flow control unit is configured to allow debris and fluid from the filtering unit to enter the entrapment cell, and is configured to substantially prevent a flow of fluid and debris from the entrapment cell to the filtering unit.

2. The pool related platform according to claim 1, wherein the entrapment cell is located below the filtering unit.

3. The pool related platform according to claim 1, comprising an additional flow control unit; wherein the first fluid opening is located between the flow control unit and the additional flow control unit.

4. The pool related platform according to claim 1, wherein each set of the two or more sets of sloped flow control elements comprises a positively sloped flow control element and a negatively sloped flow control element.

5. The pool related platform according to claim 4, wherein a distance between bottom ends of the positively sloped flow control element and the negatively sloped flow control element is smaller than a distance between upper ends of the positively sloped flow control element and the negatively sloped flow control element.

6. The pool related platform according to claim 4, wherein the sloped flow control elements are plates.

7. The pool related platform according to claim 4, wherein a distance between bottom ends of the positively sloped flow control element and the negatively sloped flow control element is smaller than (i) a length of the positively sloped flow control element, and (ii) a length of the negatively sloped flow control element.

8. The pool related platform according to claim 4, wherein a length of each one of the positively sloped flow control element and the negatively sloped flow control element is smaller than a width of each one of the positively sloped flow control element and the negatively sloped flow control element.

9. The pool related platform according to claim 8, wherein the width of each one of the positively sloped flow control element and the negatively sloped flow control element exceeds half of a width of the housing.

10. The pool related platform according to claim 4, wherein the positively sloped flow control element and the negatively sloped flow control element are symmetrical about a symmetry axis.

11. The pool related platform according to claim 1, wherein each set of the two of more sets of sloped flow control elements consists of a positively sloped flow control element and a negatively sloped flow control element.

12. The pool related platform according to claim 1, wherein each set of the two or more sets of sloped flow control elements are static.

13. The pool related platform according to claim 1, wherein the entrapment cell is positioned between the filtering unit and a bottom of the housing.

14. The pool related platform according to claim 1, further comprising a sensor for sensing when the filtering element is clogged to a predefined level.

15. The pool related platform according to claim 14, comprising a controller that is configured to trigger the backwash process when the sensor senses that the filtering element is clogged to the predefined level.

16. The pool related platform according to claim 15, wherein the sensor is configured to sense a pressure within the pool related platform.

17. The pool related platform according to claim 15, wherein the sensor is configured to monitor at least one of a pump motor and an impeller of the fluid flow mechanism.

* * * * *